UNITED STATES PATENT OFFICE 2,668,828

S,S-BIS(ETHYLXANTHOYL) O-ETHYL TRITHIOPHOSPHATE

Henry Tolkmith, Midland, Mich., assignor to The Dow Chemical Company, Midland, Mich., a corporation of Delaware No Drawing. Application April 21, 1953, Serial No. 350,241

1 Claim. (Cl. 260—455)

The present invention is directed to S,S-bis-(ethylxanthoyl) O-ethyl trithiophosphate of the formula

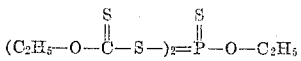

This compound is a viscous oil, somewhat soluble in many organic solvents and substantially insoluble in water. It is of value as an intermediate for the preparation of more complex phosphorus derivatives and as a toxic constituent of parasiticide compositions.

The new compound may be prepared by reacting two molecular proportions of an alkali metal ethylxanthate with one molecular proportion of O-ethyl thiophosphoric dichloride of the formula

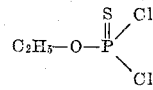

in an inert organic solvent such as benzene. In practice, sodium ethylxanthate is preferably employed as the alkali metal xanthate reactant.

In carrying out the reaction, the O-ethyl thiophosphoric dichloride and sodium ethylxanthate are dispersed in the solvent and the resulting mixture heated for a period of time at a temperature of from 40° to 80° C. In practice, it is sometimes convenient to operate at the boiling temperature of the reaction mixture and under reflux. Since the desired product has a tendency to decompose at temperatures in excess of 80° C., reaction temperatures substantially in excess of 80° C. for any appreciable period of time are to be avoided. Upon completion of the reaction, the mixture may be distilled under reduced pressure at gradually increasing temperatures up to a temperature of 80° C. to separate low boiling constituents and to obtain as a residue S,S-bis-(ethylxanthoyl) O-ethyltrithiophosphate.

The O-ethyl thiophosphoric dichloride employed as a starting material in the above-described method may be prepared by reacting at least one molecular proportion of phosphorus thiochloride (PSCl₃) with one molecular proportion of ethanol. In carrying out the reaction, the alcohol is added portionwise with stirring to the phosphorus thiochloride. The reaction takes place readily at temperatures of from 0°–20° C. The reaction is somewhat exothermic, temperature being regulated by the rate of contacting of the reactants and by the addition and subtraction of heat, if required. Upon completion of the reaction the mixture may be fractionally distilled under reduced pressure to separate the desired O-ethyl thiophosphoric dichloride. The latter is a water-clear liquid having a boiling point of 68° C. at 20 millimeters pressure.

In a representative operation, 10 grams (0.07 mole) of sodium ethylxanthate was added to 5 grams (0.028 mole) of O-ethyl thiophosphoric dichloride dispersed in benzene and the resulting mixture heated for 1.25 hours at the boiling temperature of the reaction mixture and under reflux. The mixture was then filtered and the filtrate concentrated by distillation under reduced pressure to a temperature up to 80° C. to obtain as a residue the desired S,S-bis(ethylxanthoyl) O-ethyl trithiophosphate product. The latter is a viscous oil having a density of 1.180 at 11° C.

The new S,S-bis(ethylxanthoyl) O-ethyl trithiophosphate product is effective as a parasiticide and adapted to be employed for the control of a wide range of agricultural and household pests such as flies, mites, aphids, beetles and cockroaches. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil in water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture.

In representative operations against flies and cockroaches, 100 percent kills of these pests are obtained with dust compositions containing 4.5 percent by weight of the toxic O-ethyl trithiophosphate.

This is a continuation in part of my copending application, Serial No. 203,771, filed December 30, 1950.

I claim:

S,S-bis(ethylxanthoyl) O-ethyl trithiophosphate.

HENRY TOLKMITH.

No references cited.